United States Patent [19]

Gordon

[11] Patent Number: 4,533,036

[45] Date of Patent: Aug. 6, 1985

[54] CONVEYOR BELT SCRAPER

[76] Inventor: James R. Gordon, 301 W. Boling, Benton, Ill. 62812

[21] Appl. No.: 541,800

[22] Filed: Oct. 14, 1983

[51] Int. Cl.³ .............................................. B65G 45/00
[52] U.S. Cl. .................................... 198/499; 15/256.5
[58] Field of Search ................... 198/499, 497; 474/92; 15/256.5, 256.6, 256.51; 267/154, 57

[56] References Cited

U.S. PATENT DOCUMENTS

| | | | |
|---|---|---|---|
| 3,656,610 | 4/1972 | McWilliams | 198/499 |
| 3,674,131 | 7/1972 | Matson | 198/499 |
| 4,171,920 | 10/1979 | Kramer et al. | 267/154 X |
| 4,202,437 | 5/1980 | Gordon | 198/497 |
| 4,257,517 | 3/1981 | MacPherson et al. | 198/497 |
| 4,290,520 | 9/1981 | Rhodes | 198/499 |

Primary Examiner—Joseph E. Valenza
Assistant Examiner—Kyle E. Shane
Attorney, Agent, or Firm—Kinzer, Plyer, Dorn & McEachran

[57] ABSTRACT

A plurality of molded, resilient elastomer blade supports are mounted on and keyed to a shaft extending across and spaced from a conveyor belt; each blade support includes an integral blade mount projection on which a scraper blade is mounted. A torsion bias mechanism, using a resilient resin torsion tube, biases the shaft to rotate the scraper blades toward the conveyor belt to compensate for wear and absorb shocks. In some embodiments, the blades are integral with the blade supports; in others, each blade is connected to its support by a connecting rod that includes a resilient joint for added flexure in the overall scraper structure.

16 Claims, 11 Drawing Figures

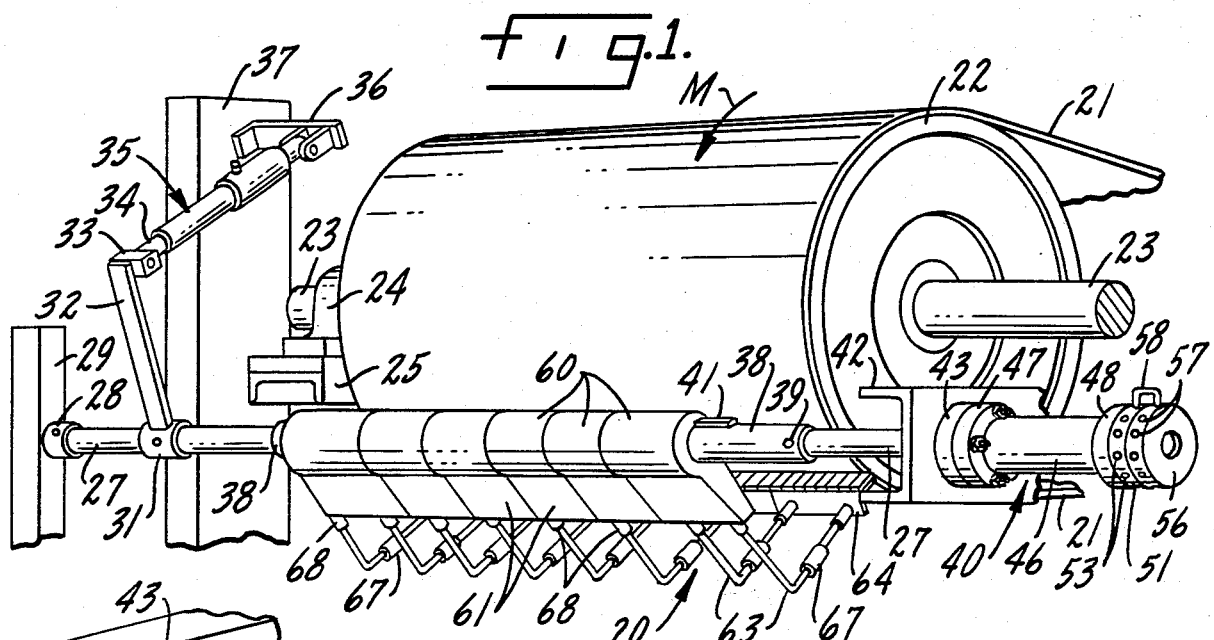
Fig. 1.
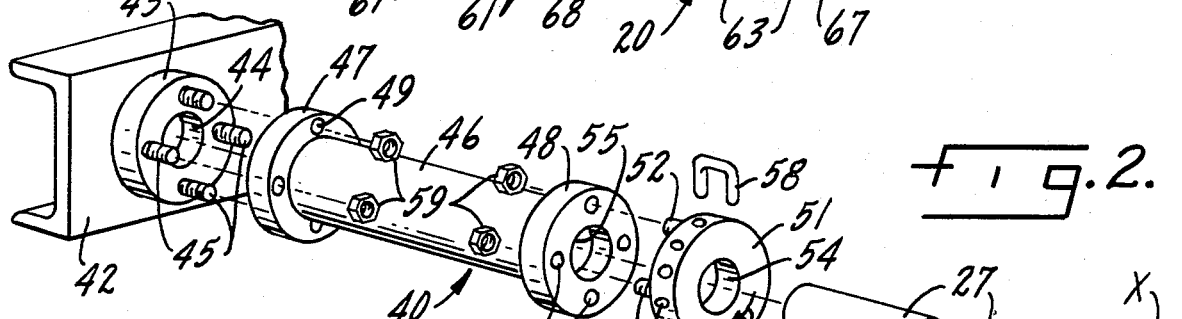
Fig. 2.
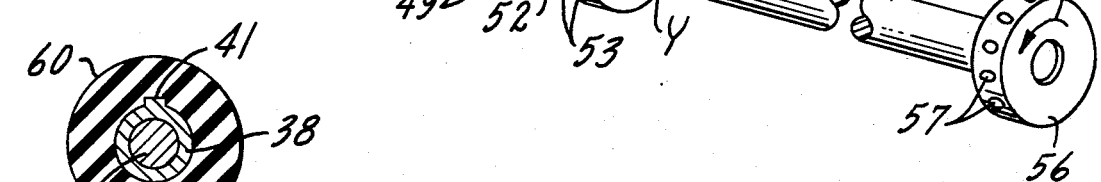
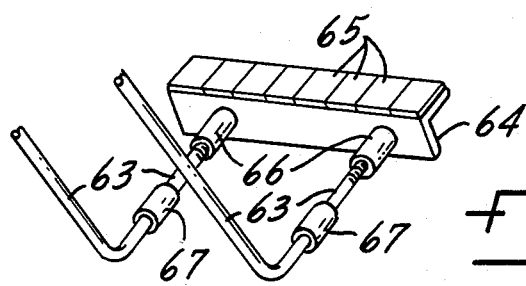
Fig. 3.    Fig. 4.
Fig. 5.
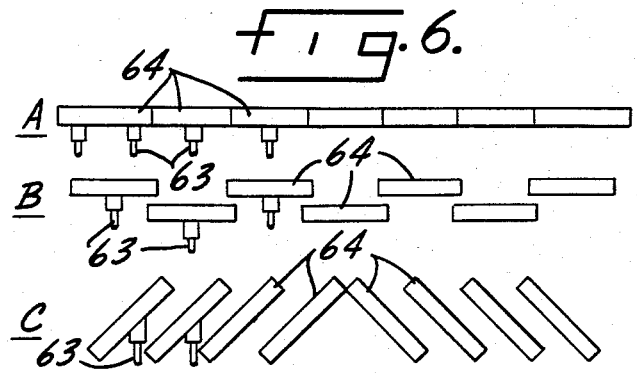
Fig. 6.

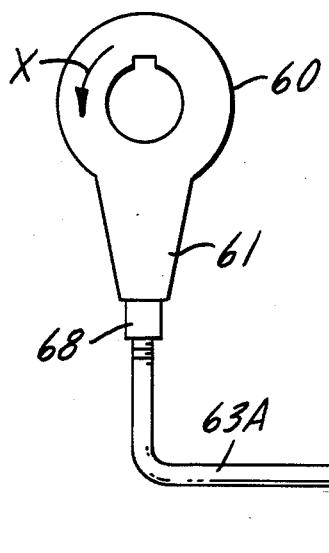
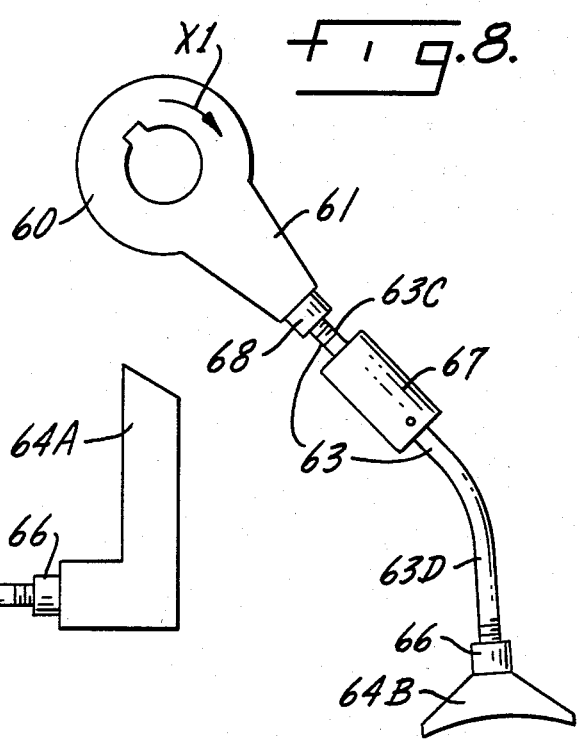
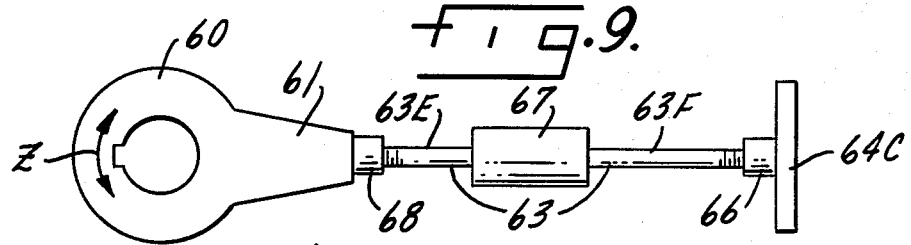
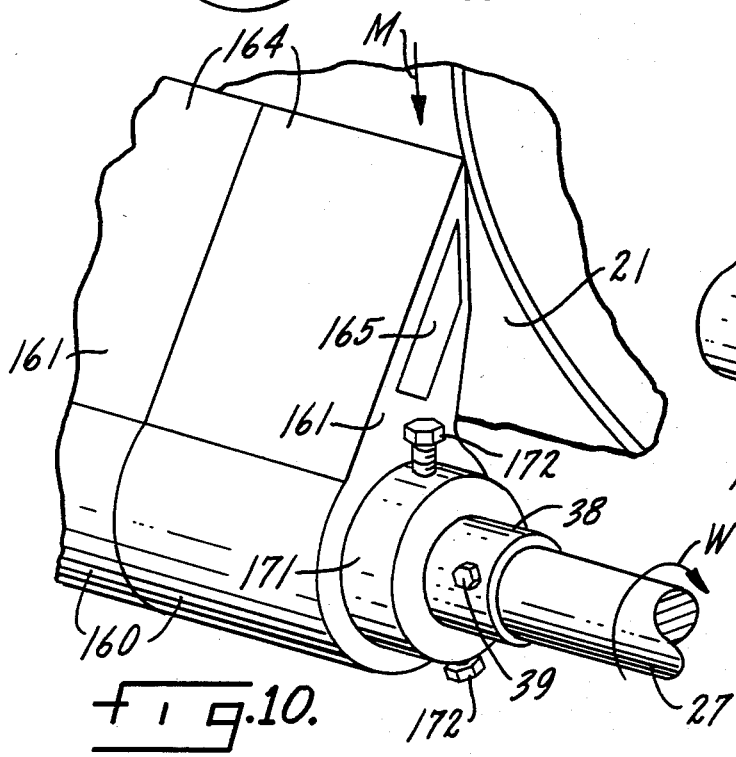
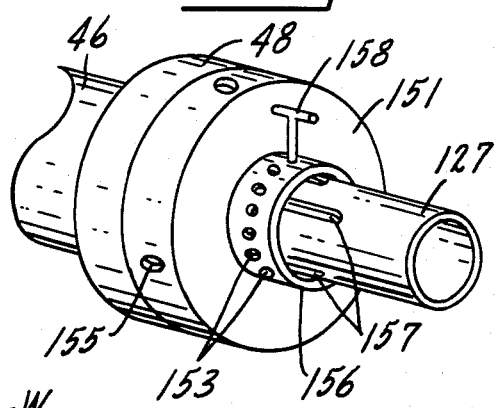

CONVEYOR BELT SCRAPER

BACKGROUND OF THE INVENTION

Belt conveyors used in mining and mineral storage and other applications must often be provided with scrapers to clear the belt of material adhering to the conveyor surface; continuing accumulation of adherent material can ultimately lead to a maintenance shutdown or to damage to the expensive conveyor belt. The operating environment for a conveyor belt scraper is frequently quite hostile. Thus, working conditions are often wet, dirty, and even corrosive. Maintenance, a continuing necessity due to inevitable wear on the scraper, is often made difficult by limited access space. In a corrosive environment, blade maintenance and replacement problems are exacerbated by corrosion of mounting bolts, clamps, etc. These difficulties are prevalent in mining operations and in industrial applications as well.

Shock problems also have a major potential adverse effect on virtually any belt conveyor/scraper system. Large pieces of the conveyed material or debris adhering to the belt, when engaged by a scraper blade, can cause appreciable damage to the scraper blade or its support, or may even damage the expensive conveyor belt. Repeated shocks of this kind, or sometimes even a single major shock, may cause an expensive shutdown for repair or replacement of major system components, or both. Wherever possible, it is critically important to minimize or avoid any shock damage, as well as to compensate for the inevitable scraper wear due to continuing normal operation.

Scraper requirements, in a belt conveyor system, vary considerably. One scraper may be, and usually is, located at the head pulley. Indeed, two or more scrapers may be needed at the head pulley. Scrapers may also be located along the length of the belt between the head and tail pulleys. A linear scraper is the most common configuration, aligned normal to or at an acute angle to the path of the conveyor belt. But in some instances a V-shaped "plow" scraper will afford the best performance, whereas in others a staggered, overlapping arrangement for multiple scraper blades is most desirable.

SUMMARY OF THE INVENTION

It is an object of the present invention, therefore, to provide a new and improved conveyor belt scraper, suitable for use in mining and heavy duty industrial applications, that provides superior shock protection for the scraper and for the conveyor belt in addition to compensating for wear on the scraper.

Another object of the invention is to provide a new and improved heavy duty conveyor belt scraper readily adaptable to use in a wide variety of locations along the belt and with full versatility as regards the alignment and configuration of the scraper blades (orthagonal line, angled line, plow, staggered overlap, etc.) relative to the conveyor belt.

A further object of the invention is to provide a new and improved conveyor belt scraper, adapted to use with belts of varying width, that incorporates a simple, inexpensive readily replaced blade mounting arrangement in combination with continuous, easily adjusted torsion bias of the blades toward the belt.

Accordingly, the invention relates to a conveyor belt scraper comprising a shaft extending transversely of a conveyor belt in spaced relation to the surface of the belt to be scraped, a plurality of molded, resilient elastomer blade supports mounted on the shaft in a longitudinal array extending across the belt, each blade support secured to the shaft for rotation therewith and each blade support including an integral blade mount projecting outwardly from the blade support, a plurality of scraper blades mounted on the blade mounts of the blade supports, each blade extending into engagement with the surface of the belt, and torsion bias means, connected to the shaft, resiliently torsionally urging the shaft toward rotation in an angular direction such as to bias the scraper blades into continuing firm engagement with the conveyor belt surface.

BRIEF DESCRIPTION OF THE DRAWINGS

FIG. 1 is a perspective view of a conveyor belt scraper constructed in accordance with one embodiment of the present invention, as installed on the head pulley of a belt conveyor;

FIG. 2 is an exploded perspective view of a torsion bias mechanism used in the conveyor belt scraper of FIG. 1;

FIG. 3 is a detail sectional view, on an enlarged scale, of a blade support used in the conveyor belt scraper of FIG. 1;

FIG. 4 is a detail perspective view, on an enlarged scale, of a scraper blade employed in the conveyor belt scraper of FIG. 1;

FIG. 5 is a detail sectional view, enlarged, of a blade mount flexure joint used in the conveyor belt scraper of FIG. 1;

FIG. 6 is a schematic illustration of some of the different scraper blade alignments that can be used in the conveyor belt scraper of the present invention;

FIGS. 7, 8 and 9 are detail elevation views illustrating scraper blades and blade mounting arrangements usable in the scrapers of the present invention;

FIG. 10 is a detail perspective view of a different scraper blade and scraper blade mount for use in the invention; and FIG. 11 is a detail perspective view of modification of the torsion bias mechanism of FIGS. 1 and 2.

DESCRIPTION OF THE PREFERRED EMBODIMENTS

FIG. 1 illustrates a conveyor belt scraper 20, comprising a first embodiment of the present invention, utilized as a head pulley scraper for a conveyor belt 21 engaged with a head pulley 22. Head pulley 22 is mounted on a pulley shaft 23. The left-hand end of pulley shaft 23, as seen in FIG. 1, is journalled in a bearing 24 mounted on a fixed frame member 25. The right-hand end of shaft 23 would be mounted in a similar bearing (not shown) and connected to an appropriate pulley drive. The direction of movement of belt 21 around head pulley 22 is indicated by arrow M.

The conveyor belt scraper 20 comprises an elongated shaft 27 that extends transversely of conveyor belt 21, in spaced relation to the surface of the belt. The left-hand end of shaft 27 is journalled in a bearing 28 supported by a fixed frame member 29. Near bearing 28, a sleeve 31 is pinned or otherwise affixed to shaft 27. A lever 32 mounted on sleeve 31 engages a contact block 33 mounted on the end of the projecting rod 34 of a shock absorber 35. Device 35 may be a pneumatic or a hydraulic shock absorber; preferably, it constitutes a pneumatic shock absorber of the kind including an enclosed pump and pressure gauge system. The end of shock absorber 35 opposite rod 34 is pivotally mounted on a bracket 36 in turn mounted upon a fixed frame member 37.

The central portion of shaft 27 is encased in an elongated sleeve 38 that is secured to the shaft for rotation by suitable means such as a plurality of pins 39. Shaft 27 may extend continuously through sleeve 38, and this arrangement is preferred in heavy duty installations in which the torsional stresses upon the shaft may be substantial. On the other hand, in some applications shaft 27 may be made in two separate segments joined by sleeve 38. An elongated key 41 extends longitudinally of sleeve 38.

The right-hand end of shaft 27 extends through an opening in a fixed frame member 42 and through a torsion bias mechanism 40; the construction of torsion bias mechanism 40 is best illustrated in the exploded perspective view of FIG. 2. As shown therein, a steel collar 43 is welded or otherwise affixed to frame member 42, collar 43 having a central opening 44 large enough to allow shaft 27 to pass freely through the opening and be rotatably supported therein. Thus, collar 43 may effectively serve as a support bearing for the right-hand end of shaft 27. Four threaded studs 45 project outwardly from collar 43.

The torsion bias mechanism 40 further comprises a torsion tube 46. A metal torsion spring could be used for tube 46. In the preferred construction, however, torsion tube 46 is of molded elastomer material, a material having excellent wear and "memory" properties. The preferred material for torsion tube 46 is a dense molded polyurethane. Torsion tube 46 includes two relatively thick integral molded flanges 47 and 48, one at each end of the tube. Flange 47 is provided with four stud-receiving apertures 49 and a similar set of apertures 49 is formed in flange 48.

The torsion bias mechanism 40 also includes a second steel collar 51 essentially similar in configuration to collar 43. Collar 51 has a plurality of projecting threaded studs 52 engageable in the apertures 49 in torsion tube flange 48. Collar 51 also is formed with a multiplicity of apertures or sockets 53 that are radially inwardly directed from the rim of the collar. The central opening 54 in collar 51, and the axial opening 55 through torsion tube 46 are each large enough to allow shaft 27 to extend therethrough without interference with rotational movement of the shaft.

A third steel collar 56 is affixed to the right-hand end of shaft 27 as seen in FIG. 2. Collar 56 includes a plurality of radially inwardly directed apertures or sockets 57 like the sockets 53 in collar 51. To complete the torsion bias mechanism 40, there is a U-shaped metal link 58; the ends of the legs of link 58 fit into the socket apertures 53 and 57 in collars 51 and 56, respectively. A plurality of nuts 59 are provided for studs 45 and 52 to assemble tube 46 on collars 43 and 51; the assembled condition for the torsion bias mechanism 40 is illustrated in FIG. 1.

As shown in FIG. 1, conveyor belt scraper 20 further comprises a plurality of molded, resilient elastomer blade supports 60. Blade supports 60 should be molded from a tough, wear resistant elastomer having excellent "memory" characteristics; a dense molded polyurethane is preferred. Blade supports 60 are mounted on the sleeve 38 that constitutes a part of shaft 27 in a longitudinal array extending across belt 21. Each blade support 60 includes a keyway engaged by the elongated key 41 on sleeve 38, so that the blade supports rotate with shaft 27 and vice versa.

As shown in FIGS. 1 and 3, each elastomer blade support 60 includes an integral blade mount 61 projecting radially outwardly from the main body of the blade support. A metal anchor 62 is embedded within the blade mount portion 61 of each blade support 60. A short metal rod 69 is welded or otherwise affixed to anchor 62 and projects out through the end of blade mount 61. Rod 69 is joined to a scraper blade connecting rod 63 by a threaded connector 68. Alternatively, the connecting rod 63 may be secured directly to anchor 62, eliminating rod 69 and connector 68. The number of connecting rods 63 for each blade support 60 may vary. Thus, as shown in FIG. 1, the two end blade supports 60 each have two connecting rods 63, whereas the shorter central blade supports 60 each include only one connecting rod 63. The number of connecting rods used depends on the axial lengths of the blade supports.

Conveyor belt scraper 20 includes a plurality of scraper blades 64 as shown in FIGS. 1 and 4. In this particular embodiment of the invention each scraper blade 64 comprises a length of metal angle to which a plurality of scraper blade contact pads 65 are secured. The contact pads 65, in this particular instance, are of a hard, highly wear-resistant material such as tungsten carbide. As shown in FIG. 4, each scraper blade 64 may be secured to one or more of the connecting rods 63 by suitable threaded connectors 66 mounted on the scraper blade.

The connecting rods 63, in the embodiment of FIGS. 1-5, are not continuous. Each rod is formed in two segments, as indicated by segments 63A and 63B in FIG. 5. The two connecting rod segments 63A and 63B are joined by a tightly fitting sleeve 67 of molded elastomer material, preferably a dense polyurethane. With this segmented construction for the connecting rods, each sleeve 67 affords a flexure joint in the medial portion of each connecting rod 63.

In considering the preliminary assembly of scraper 20 in operational position as shown in FIG. 1, it may be assumed that suitable fixed frame members 29, 37, and 42 are available or can be made available at the desired position for the scraper with little difficulty. If shaft 27 is continuous between frame members 29 and 42, it is necessary to assemble blade supports 60 on the shaft before the shaft is mounted in operational position. If shaft 27 is fabricated in two sections joined by sleeve 38, the blade supports can be conveniently assembled on the sleeve and mounted on the shaft with one or both sections of the shaft already in place. The torsion bias mechanism 40 is initially assembled in the manner described above and as shown in FIG. 1, except for link 58.

With the conveyor belt scraper 20 initially assembled, shaft 27 is rotated in a counterclockwise direction (arrow X in FIG. 2) until the scraper blades 64 engage the surface of belt 21 as shown in FIG. 1. Shaft 27 is then held in this position. For additional leverage a wrench or lever may be inserted in one of the sockets 57 in collar 56 to help hold the scraper shaft against rotation. A wrench or lever is then inserted in one of the sockets 53 in collar 51 and utilized to rotate collar 51 in a clockwise direction (arrow Y in FIG. 2). Of course, a corresponding clockwise rotation is effected for flange 48 on torsion tube 46. However, the other end of torsion tube 46 cannot turn because flange 47 is anchored to fixed collar 43 by studs 45. Consequently, torsion tube 46 is twisted by the rotational movement of collar 51.

Clockwise rotation of collar 51 and the right hand end of torsion tube 46 is carried out until a substantial twisting of torsion tube 46 is effected, sufficient to exert an appreciable reverse torsional force. At this point, the rotation of collar 51 is interrupted with the sockets 53 in that collar aligned with the sockets 57 in the collar 56 on shaft 27. Link 58 is then inserted in any pair of the sockets, as shown in FIG. 1, and prevents further relative angular displacement between shaft 27 and torsion tube 46. As a result, torsion tube 46, acting through the collars 51 and 56 and link 58, applies a continuous counter-clockwise torsion bias to shaft 27, arrow X. This bias force acts through blade supports 60 and connecting rods 63, urging the scraper blades 64 into firm contact with the exposed surface of belt 21 throughout the width of scraper 20. Each blade can be individually adjusted to conform to belt 21 by adjusting its connectiong rod(s) in or out of connectors 66 (FIG. 4).

As previously noted, torsion tube 46 is preferably a molded tube of relatively dense, resilient resin having a strong "memory", with polyurethane constituting the preferred elastomer resin. Polyurethane has excellent operating properties as applied to the torsion tube and is highly resistant to deterioration from the effects of the frequently hostile environments encountered for conveyor belt scrapers like scraper 20. Thus, it can be anticipated that the torsion bias mechanism 40, properly constructed, will afford a long operating life.

Conveyor belt scraper 20 combines a number of highly advantageous operating features. One of those features is the superior shock protection incorporated in scraper 20. Shock loading of the scraper is fairly common, as an incident to movement of any outsize adherent material on the surface of the belt into engagement with scraper blades 64. The forces applied to the scraper can be substantial, particularly for large pieces of conveyed material or debris that are firmly adhere firmly to the conveyor belt.

Any shocks of this kind are absorbed in part by resilient flexural couplings afforded by sleeves 67 in connecting rod 63, by flexure of blade mounts 61 and blade support 60, and by angular deflection of torsion tube 46. Further, such shocks are effectively damped by shock absorber 35 through its connection to shaft 27 afforded by lever 32. The overall combination of resilient elements in scraper 20, particularly flexure joints 67, blade mounts 61, and torsion tube 46, affords superior shock protection characteristics as compared with virtually any previously known conveyor belt scraper.

Torsion bias mechanism 40, in addition to providing a part of the shock protection for scraper 20, affords effective continuing compensation for wear along the line of contact between scraper blades 64 and the surface of belt 21. Thus, as the scraper blades wear the continuing bias force in the direction of arrow X exerted by the pre-stressed torsion tube 46 assures the maintenance of effective contact between the scraper blades and the conveyor belt surface.

In any scraper, continuing wear on the scraper elements ultimately produces a need for replacement. In belt scraper 20 it is a simple matter to remove the individual scraper blades either by pulling the connector rod segments 63B out of sleeves 67 or by disconnecting the threaded connectors 66 from rods 63 (FIGS. 1, 4 and 5), immediately replacing the scraper blades with new ones. Thus, major maintenance in the form of blade replacement does not require disassembly of any part of the belt scraper 20; it is accomplished by quick and convenient removal and replacement of the blades. If a poor initial selection of scraper blade type has been made, or if a change in the use of conveyor 21 dictates a change of the kind of scraper blade used, replacement is readily effected in the same manner.

Conveyor belt scraper 20 can be readily adapted to use with conveyor belts of varying widths. In assembling a scraper for use with a belt of given width, the only components affected by the belt width are shaft 27 (length) and blade supports 60 and scraper blades 64 (number and length). The torsion bias mechanism 40 is unaffected by belt width, as are the particular types of blade supports and blades. From connectors 68 (FIGS. 1 and 3) the system can accommodate blade connector rods 63 of almost any length and shape, and a wide variety of scraper blades formed of diverse materials such as rubber, urethane, steel, carbide, etc. A vaariety of different blades and connector rods are described below.

Belt scraper 20, as shown in FIG. 1, has the scraper blades 64 arranged in a linear array that is orthagonally aligned relative to the path of movement of belt 21. However, as will be readily apparent, shaft 27 could be aligned to traverse belt 21 at an appreciable angle. An angularly aligned scraper of this kind, usually employed at some point along belt 21 away from either the head pulley or the tail pulley, presents no appreciable difficulties. Thus a linear array of scraper blades 69, shown schematically in FIG. 6A, can be aligned at virtually any desired angle to the direction of movement of the conveyor belt.

FIG. 6B shows another arrangement that may be advantageous in some applications. In this instance, the scraper blades 64 are disposed in staggered overlapping relation to each other. This arrangement can be achieved, with all of the blades mounted on a single scraper shaft, simply by varying the lengths of the connecting rods 63.

A plow arrangement is also readily achieved, as shown in FIG. 6C. In this instance, half of the blades 64 are disposed at one angle and the other half at a different angle, with the two scraper blades at the center of the array arranged in a V configuration. Again, all of the scraper blades 64 can be connected to one scraper shaft. For this arrangement, the connecting rods 63 extend away from each blade 64 at an angle appropriate to the desired plow alignment for the scraper.

FIGS. 7, 8 and 9 illustrate some of the different variations in scraper blades and scraper blade mounts that can be utilized in the present invention. The construction shown in FIG. 7 has the same blade supports 60 and blade mounts 61 as in the belt scraper 20 of FIGS. 1-5. The connecting rods 63 with their intermediate flexure joints 67 are also essentially the same as in the first-described embodiment. In this instance, however, the scraper blade 64A is of L-shaped configuration.

The construction illustrated in FIG. 8 again utilizes the same blade support 60 and blade mount 61 as in the embodiment of FIGS. 1-5. In this instance, the initial segment 63C of the connecting rod 63 has been shortened and is joined by flexure joint 67 to a curved connecting rod segment 63D. Another different scraper blade 64B is shown in FIG. 8; blade 64B is of a type disclosed and claimed in the co-pending application of James Gordon Ser. No. 406,366, filed Aug. 9, 1982.

FIG. 9 illustrates a compact scraper blade mount that also utilizes the same blade support 60 and blade mount 61 as the embodiment of FIGS. 1–5. The two sections 63E and 63F of the connecting rod 63 in the construction shown in FIG. 9 are both linear in configuration and are joined, as before, by a flexure joint 67. The scraper blade 64C is of a different shape from any of those of the preceding figures.

The blade mounting arrangements shown in FIGS. 7–9 are far from exhaustive in reference to the versatility of the invention. By changing the shape and length of connecting rods 63, the invention is readily adaptable to virtually any shape of scraper blade and practically any space restrictions that may be presented by the conveyor to which the scraper is applied. The direction of bias required for the scraper blades may change. For the embodiment of FIG. 7, the direction of bias required of mechanism 40 (FIGS. 1 and 2) is in the same counter-clockwise direction X as for the first described embodiment. For FIG. 8, the direction of required bias is clockwise as indicated by arrow X1. This requires no change in torsional bias mechanism 40; when the scraper is assembled, the torsion tube is simply deflected in the opposite direction from that described above prior to application of connecting link 58. That is, the same torsion tube bias mechanism 40 can provide for bias in either a clockwise direction or a counterclockwise direction to meet the particular needs of the scraper application. For the blade arrangement shown in FIG. 9, the bias required may be either clockwise or counterclockwise, as indicated by the double arrow Z, depending upon the point of engagement between blade 64C and the conveyor belt surface.

In some conveyor belt scrapers, particularly where space is at an absolute minimum, it may be desirable to modify the scraper to integrate the scraper blades with the blade supports. A construction of this kind is shown in FIG. 10. In the construction shown in FIG. 10 each blade support 160 includes a projecting blade mount portion 161 which is integral with a scraper blade 164. That is, each scraper blade 164 is molded integrally with its blade mount 161 and blade support 160. To stiffen each blade 164, a rigid insert 165 may be incorporated in the blade. FIG. 10 also shows a collar 171 mounted on sleeve 38 by suitable means such as a series of set screws 172. A similar collar 171 would be mounted at the opposite end of the assembly of blade supports 160, the two collars being utilized to maintain the desired positioning of the blade supports and scraper blades along the length of shaft 27. Similar positioning collars may also be utilized in the embodiment of FIG. 1.

The integral scraper blade construction shown in FIG. 10 is less desirable than the previously described embodiments in relation to overall shock protection and ease of replacement of the scraper blades, but does have the advantage of providing the optimum in compactness of construction for the scraper. The appropriate direction of bias for shaft 27, in the embodiment of FIG. 10, is clockwise as indicated by arrow W. Blade 164 is shown as having a relatively thin scraping edge; scraper blades of blunt configuration can also be used in this variation of the invention.

FIG. 11 illustrates a modification of the torsion bias mechanism that affords additional impact and shock protection. In this modification a steel collar 151 is again secured to the outer flange 48 on torsion tube 46. Collar 151 has a series of sockets 155 around its periphery. Collar 151 further comprises an integral tubular extension sleeve 156 in which a multiplicity of pin-receiving apertures 153 are formed.

The scraper shaft 127 in the embodiment of FIG. 11 is of tubular construction and is provided with a plurality of elongated pin-receiving slots 157. A shear pin 158 extends through one of the apertures 153 in sleeve 156 and through one of the slots 157 in shaft 127 to secure collar 151 to the shaft, serving the same basic linking function as link 58 in FIG. 1. Use of shear pin 158 protects the scraper system against any heavy impact that otherwise could damage the scraper or the conveyor belt. Alignment and adjustment of the torsion bias mechanism is unchanged.

I claim:

1. A conveyor belt scraper comprising:
    a shaft extending transversely of a conveyor belt in spaced relation to the surface of the belt to be scraped;
    a plurality of molded, resilient elastomer blade supports mounted on the shaft in a longitudinal array extending across the belt, each blade support secured to the shaft for rotation therewith and each blade support including an integral flexurally resilient elastomer balde mount arm projecting outwardly from the blade support;
    a plurality of scraper blades mounted on the blade mounts of the blade supports, each blade extending into engagement with the surface of the belt; and
    torsion bias means, connected to the shaft, resiliently torsionally urging the shaft toward rotation in an angular direction such as to bias the scraper blades into continuing firm engagement with the conveyor belt surface, the torsion bias means comprising:
    a torsion tube of elastomer material encompassing a portion of the shaft and having one end affixed to a fixed frame member;
    first and second rigid collars, each affixed to one end of the torsion tube, the first collar being affixed to the fixed frame member;
    and adjustable link means for connecting the second collar to the shaft to maintain the second collar and the shaft in any one of a plurality of different angular orientations relative to each other to thereby adjust the effective bias force on the shaft.

2. A conveyor belt scraper according to claim 1 in which the link means further comprises a third rigid collar affixed to the shaft adjacent the second collar on the torsion tube, and a removable connecting link interconnecting the second and third collars.

3. A conveyor belt scraper according to claim 2 in which one of the second and third collars has a plurality of radially inwardly directed apertures in its rim, the other of the second and third collars has at least one radially inwardly directed aperture in its rim, and the connecting link is a U-shaped metal link having ends adapted to fit into such apertures.

4. A conveyor belt scraper according to claim 3 in which the torsion tube is of molded polyurethane.

5. A conveyor belt scraper according to claim 1 in which the adjustable link means comprises a removable link connecting the second collar to the shaft and in which the removable connecting link is a shear pin adapted to shear when the shaft is subjected to unusual angular stress.

6. A conveyor belt scraper according to claim 5 in which the shaft includes at least one pin-receiving slot, the second collar includes a plurality of pin-receiving apertures alignable with the slot in the shaft, and the link shear pin extends through one of the pin-receiving apertures in the second collar and into the pin-receiving slot in the shaft.

7. A conveyor belt scraper according to claim 6 in which the torsion tube is of molded polyurethane.

8. A conveyor belt scraper according to claim 1 in which each scraper blade is of resilient elastomer material, molded integrally in a one-piece construction with the blade mount arm and the blade support as an extension of the blade mount arm.

9. A conveyor belt scraper according to claim 8 in which the link means further comprises a third rigid collar affixed to the shaft adjacent the second collar on the torsion tube, and a removable connecting link interconnecting the second and third collars.

10. A conveyor belt scraper according to claim 9 in which the removable connecting link is a shear pin adapted to shear when the shaft is subjected to unusual angular stress.

11. A conveyor belt scraper according to claim 10 in which the shaft includes at least one pin-receiving slot, the second collar includes a plurality of pin-receiving apertures alignable with the slot in the shaft, and the link shear pin extends through one of the pin-receiving apertures in the second collar and into the pin-receiving slot in the shaft.

12. A conveyor belt scraper according to claim 1 and further comprising:
a plurality of metal connecting rods, at least one for each scraper blade, for mounting the scraper blades on the blade mounts, each connecting rod having one end anchored in a blade mount arm and the other end affixed to a scraper blade, each connecting rod including a flexure joint in the medial portion of the rod.

13. A conveyor belt scraper according to claim 12 in which each connecting rod is formed in two segments, joined at the flexure joint by a sleeve of tough, resilient elastomer material.

14. A conveyor belt scraper according to claim 13 in which the link means further comprises a third rigid collar affixed to the shaft adjacent the second collar on the torsion tube, and a removable connecting link interconnecting the second and third collars.

15. A conveyor belt scraper according to claim 14 in which the removable connecting link is a shear pin adapted to shear when the shaft is subjected to unusual angular stress.

16. A conveyor belt scraper according to claim 13 in which the shaft includes at least one pin-receiving slot, the second collar includes a plurality of pin-receiving apertures alignable with the slot in the shaft, and the link shear pin extends through one of the pin-receiving apertures in the second collar and into the pin-receiving slot in the shaft.

* * * * *